(12) United States Patent
Kim et al.

(10) Patent No.: US 9,382,694 B2
(45) Date of Patent: Jul. 5, 2016

(54) SYSTEM AND METHOD OF CONTROLLING VEHICLE OF CONSTRUCTION EQUIPMENT

(71) Applicant: DOOSAN INFRACORE CO., LTD., Incheon (KR)

(72) Inventors: Dong Mok Kim, Incheon (KR); Lee Hyoung Cho, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 14/577,489

(22) Filed: Dec. 19, 2014

(65) Prior Publication Data

US 2015/0176252 A1    Jun. 25, 2015

(30) Foreign Application Priority Data

Dec. 20, 2013  (KR) .................. 10-2013-0160118
Sep. 18, 2014  (KR) .................. 10-2014-0124288

(51) Int. Cl.

| | | |
|---|---|---|
| *E02F 9/22* | (2006.01) | |
| *G05D 17/02* | (2006.01) | |
| *G05D 27/02* | (2006.01) | |
| *G05D 16/04* | (2006.01) | |
| *G05D 16/20* | (2006.01) | |
| *E02F 9/20* | (2006.01) | |
| *B60W 10/30* | (2006.01) | |
| *F02D 29/04* | (2006.01) | |

(52) U.S. Cl.
CPC .............. *E02F 9/2246* (2013.01); *B60W 10/30* (2013.01); *E02F 9/2066* (2013.01); *E02F 9/2235* (2013.01); *G05D 16/04* (2013.01); *G05D 16/20* (2013.01); *G05D 17/02* (2013.01); *G05D 27/02* (2013.01); *F02D 29/04* (2013.01)

(58) Field of Classification Search
None
See application file for complete search history.

(56) References Cited

U.S. PATENT DOCUMENTS

| | | | | |
|---|---|---|---|---|
| 6,886,652 | B2* | 5/2005 | Maekawa et al. | 180/248 |
| 7,607,296 | B2* | 10/2009 | Ohigashi et al. | 60/431 |
| 8,126,621 | B2* | 2/2012 | Ishii et al. | 701/50 |
| 8,424,298 | B2* | 4/2013 | Ariga et al. | 60/329 |
| 8,874,327 | B2* | 10/2014 | Ishihara et al. | 701/50 |
| 9,043,099 | B2* | 5/2015 | Tanaka et al. | 701/50 |

(Continued)

FOREIGN PATENT DOCUMENTS

| | | |
|---|---|---|
| EP | 0037838 A1 | 10/1981 |
| EP | 0062072 A1 | 10/1982 |

(Continued)

OTHER PUBLICATIONS

European Search Report dated Jun. 3, 2015 for European Application No. 14198327.0, 7 pages.

(Continued)

*Primary Examiner* — Yonel Beaulieu
*Assistant Examiner* — Krishnan Ramesh
(74) *Attorney, Agent, or Firm* — John D. Veldhuis-Kroeze; Westman, Champlin & Koehler, P.A.

(57) ABSTRACT

The present disclosure relates to a system and method of controlling a vehicle of construction equipment, which calculate a target engine torque from compensation torque information using torque information generated in a hydraulic pump and an engine speed error and transmit the calculated target engine torque, thereby more stably performing engine control while responding to a rapid load variation of the hydraulic pump.

22 Claims, 7 Drawing Sheets

(56) References Cited

U.S. PATENT DOCUMENTS

| | | | |
|---|---|---|---|
| 9,068,321 B2* | 6/2015 | Hoshino et al. | |
| 2004/0168846 A1* | 9/2004 | Maekawa et al. | 180/248 |
| 2005/0160727 A1* | 7/2005 | Nakamura et al. | 60/431 |
| 2007/0101708 A1* | 5/2007 | Ohigashi et al. | 60/431 |
| 2007/0227137 A1* | 10/2007 | Naruse | 60/426 |
| 2010/0070146 A1* | 3/2010 | Ishii et al. | 701/50 |
| 2010/0186402 A1* | 7/2010 | Ariga et al. | 60/329 |
| 2013/0090835 A1* | 4/2013 | Take et al. | 701/103 |
| 2013/0325268 A1* | 12/2013 | Ishihara et al. | 701/50 |
| 2014/0005900 A1* | 1/2014 | Tanaka et al. | 701/50 |
| 2014/0255212 A1* | 9/2014 | Endo et al. | 417/34 |
| 2015/0008054 A1* | 1/2015 | Hoshino et al. | 180/65.26 |
| 2015/0033718 A1* | 2/2015 | Kaneko | 60/327 |

FOREIGN PATENT DOCUMENTS

| | | |
|---|---|---|
| EP | 0326150 A1 | 8/1989 |
| JP | S56-056931 | 5/1981 |
| JP | S62-029780 | 2/1987 |
| JP | 2002-364603 A | 12/2002 |
| JP | 2005-061298 | 3/2005 |
| JP | 2008-196165 | 8/2008 |

OTHER PUBLICATIONS

Japanese Office Action dated Oct. 27, 2014 for Japanese Application No. 2014-0255098, 5 pages.

* cited by examiner

SYSTEM AND METHOD OF CONTROLLING VEHICLE OF CONSTRUCTION EQUIPMENT

CROSS-REFERENCE TO RELATED APPLICATIONS

This application is based on and claims priority from Korean Patent Application Nos. 10-2013-0160118, filed on Dec. 20, 2013, and 10-2014-0124288, filed on Sep. 18, 2014, with the Korean Intellectual Property Office, the disclosure of which is incorporated herein in its entirety by reference.

TECHNICAL FIELD

The present disclosure relates to a system and a method for controlling a vehicle of construction equipment.

BACKGROUND

Construction equipment, such as a hydraulic pressure shovel, generally includes a diesel engine as a motor. The construction equipment rotates at least one capacity variable hydraulic pump by using the diesel engine. The construction equipment performs a necessary operation by driving a hydraulic actuator by pressed oil discharged from the hydraulic pump. The diesel engine includes an input means, such as an accelerator lever, for directing target revolutions per minute (RPM) of the engine, and controls the amount of fuel injected and the RPM of the engine according to the target RPM of the engine and an input load transmitted through the hydraulic pump and the like.

The construction equipment calculates a difference between the original target RPM of the engine and an actual RPM of the engine (RPM deviation) by using an RPM sensor in relation to the control of the engine and the hydraulic pump. The construction equipment performs speed sensing control for controlling an input torque of the hydraulic pump by using the calculated RPM deviation. However, in the control method, an engine control unit uses only an actual RPM of the engine as information based on which the engine is controllable in response to a large load variation transmitted from the hydraulic pump to the engine. The hydraulic load which continuously and greatly varies for operating the construction equipment is transmitted to the engine, which is mechanically and directly connected with the hydraulic pump, so that an actual RPM of the engine is decreased by an insufficient torque generation of the engine. Accordingly, the engine control unit may respond to a rapid load after the actual RPM of the engine is decreased.

In general, since the engine control unit has a very complicated control logic compared to a pump controller or a vehicle controller, the implementation of compensation control within the engine control unit demands reviews with long time and effort. Verification when the compensation control is implemented also requires much time and effort, such that product development resources are negatively increased.

Further, when the pump controller or the vehicle controller calculates a torque of the hydraulic pump, and the engine control unit performs the compensation control, accuracy of the calculated torque of the hydraulic pump is degraded, so that even though a compensation torque value is increased, only the engine control unit recognizes the increase in the compensation torque value. That is, there is a disadvantage in that the pump controller or the vehicle controller, which calculates the torque of the hydraulic pump, cannot accurately recognize the calculated torque value.

The discussion above is merely provided for general background information and is not intended to be used as an aid in determining the scope of the claimed subject matter.

SUMMARY

The present disclosure has been made in an effort to provide a system and a method of controlling a vehicle of construction equipment, which are capable of more stably performing compensation control with respect to an error occurring when an engine control unit performs the compensation control.

An exemplary embodiment of the present disclosure provides a system for controlling a vehicle of construction equipment, including: an engine; a hydraulic pump operated by power supplied from the engine; one or more actuators driven by a hydraulic pressure discharged from the hydraulic pump; a hydraulic pump control device configured to calculate a compensation torque according to a hydraulic pump torque and an engine speed error between an actual engine RPM and a target engine RPM, compensates for the calculated hydraulic pump torque with the calculated compensation torque, and outputs the compensated torque as a target engine torque; and an engine control unit configured to control a torque of the engine based on the output target engine torque.

The hydraulic pump control device may include: a hydraulic pump torque calculating unit configured to calculate a hydraulic pump torque by using a discharge capacity and a discharge pressure of the hydraulic pump; a speed error calculating unit configured to calculate an engine speed error between the actual engine RPM and the target engine RPM; a compensation torque calculating unit configured to calculate a compensation torque by using the calculated hydraulic pump torque and the calculated engine speed error, compensate for the calculated hydraulic pump torque with the calculated compensation torque, and output the compensated torque as a target engine torque; a target torque information transmitting unit configured to transmit the output target engine torque; and an engine control unit configured to control a torque of the engine based on the target engine torque received from the target torque information transmitting unit.

Negacon is an abbreviation for negative flow control among a hydraulic system. A pressure of a hydraulic line, which returns from a MCV (Main Control Valve) to a tank, is called the negacon control pressure. The negacon control pressure is concerned in the control of a hydraulic pump. Posicon is an abbreviation for positive flow control among a hydraulic system. A pilot pressure of a joystick is called the posicon control pressure. The posicon control pressure is also concerned in the control of a hydraulic pump. The hydraulic pump torque calculating unit may calculate a discharge capacity of the hydraulic pump by using a pressure selected from a pressure for power shift control and a negacon pressure, and the discharge pressure of the hydraulic pump. Further, when the hydraulic pump is an electronic pump controlled by a current value, the hydraulic pump torque calculating unit may calculate a discharge capacity of the hydraulic pump by using a value of a swash plate angle sensor, or a current command value for controlling a swash plate angle and a value of a discharge pressure sensor.

The hydraulic pump torque calculating unit may calculate a discharge capacity of the hydraulic pump by using a control pressure of a regulator which controls a swash plate angle or a value of a swash plate angle sensor.

The hydraulic pump torque calculating unit may generate a delay in the hydraulic pump torque increased according to an increase in the discharge pressure of the hydraulic pump to compensate for a time delay of a swash plate angle of the hydraulic pump.

The hydraulic pump torque calculating unit may calculate the hydraulic pump torque by using a temperature of working fluid in addition to the discharge pressure of the hydraulic pump, a pressure for power shift control, and a regulator control value.

The compensation torque calculating unit may calculate a compensation torque by using a table according to the calculated engine speed error and a load quantity, or a proportional-integral-derivative (PID) controller.

The system may be any one of a hydraulic system of a negacon method, a hydraulic system of a posicon method, and a hydraulic system of a load sensing method. For the negacon hydraulic system using two pumps, a discharge flow rate and a torque of a corresponding hydraulic pump may be estimated by using a first discharge pressure, a second discharge pressure, a first negacon pressure, a second negacon pressure, and a power shift pressure. In this case, in order to accurately calculate a flow rate and torque, the aforementioned five control pressures need to be recognized. For the posicon hydraulic system, a discharge flow rate and a torque may be estimated by using all of a first discharge pressure that is a pressure of a regulator, a second discharge pressure, a first posicon pressure, a second posicon pressure, and a power shift pressure of a hydraulic pump. For the hydraulic system of the load sensing method, a discharge flow rate and a torque of a corresponding hydraulic pump may be estimated based on a regulator control pressure, such as a first regulator control pressure, a second regulator control pressure, and a third regulator control pressure of a corresponding hydraulic pump.

In the meantime, for the electronic hydraulic pump for controlling a flow rate by a current command, such as virtual bleed-off (VBO), a flow rate of the hydraulic pump may be calculated and a torque of the hydraulic pump may be estimated by using a first discharge pressure, a second discharge pressure, a first current command value, a second current command value, a value of a first swash plate angle sensor, a value of a second swash plate angle sensor. In the electronic pump, such as the VBO, the regulator for controlling a swash plate angle moves according to a current command calculated by the pump control unit. That is, in order to calculate a flow rate of the VBO pump, the flow rate may be estimated by using a value of the swash plate angle sensor or a current command value for controlling a swash plate angle and a value of a discharge pressure sensor. A torque of the hydraulic pump may be estimated by using the estimated pump flow rate and the detected value of the discharge pressure sensor. That is, a torque of the electronic pump may be estimated by using the first discharge pressure, the second discharge pressure, the value of the first swash plate angle sensor, the value of the second swash plate angle sensor, or all of the first discharge pressure, the second discharge pressure, the first current command value, the second current command value, the value of the first swash plate angle sensor, and the value of the second swash plate angle sensor.

The hydraulic pump control device may further include: an engine torque information receiving unit configured to receive engine torque limit information and current engine torque information; a hydraulic pump output limit calculating unit configured to calculate a hydraulic pump output limit, which is to be commanded to the hydraulic pump, by using the engine torque limit information received through the engine torque information receiving unit; a hydraulic pump flow rate control determining unit configured to determine whether a current hydraulic pump output calculated by using a pump discharge pressure and a pump model is greater than a hydraulic pump output limit calculated by the hydraulic pump output limit calculating unit, determine whether a difference value between the current engine torque information and the engine torque limit information is equal to or smaller than a predetermined reference value, and determine whether a flow rate limit control function is activated; and a hydraulic pump flow rate limit control unit configured to control an output of the hydraulic pump in proportion to the difference value between the current hydraulic pump output and the hydraulic pump output limit when the flow rate limit control function is activated according to a result of the determination of the hydraulic pump flow rate control determining unit.

The system may further include a rapid load determining unit configured to determine whether a rapid load is generated by using an increase rate of the pump discharge pressure, in which when the rapid load is generated in the hydraulic pump according to a result of the determination of the rapid load determining unit, the engine torque information receiving unit may receive the engine torque limit information and the current engine torque information.

Another exemplary embodiment of the present disclosure provides a method of controlling a vehicle of construction equipment, including: calculating a hydraulic pump torque by using a discharge capacity and a discharge pressure of the hydraulic pump; calculating an engine speed error between the actual engine RPM and the target engine RPM; calculating a compensation torque by using the calculated hydraulic pump torque and the calculated engine speed error; compensating for the calculated hydraulic pump torque with the calculated compensation torque, and outputting the compensated torque as a target engine torque; and controlling a torque of an engine based on the output engine target torque.

The calculating of the hydraulic pump torque may include calculating a discharge capacity of the hydraulic pump by using a pressure selected from a pressure for power shift control and a negacon pressure, and the discharge pressure of the hydraulic pump.

The calculating of the hydraulic pump torque may include, when the hydraulic pump is an electronic pump controlled by a current value, calculating a discharge capacity of the hydraulic pump by using a value of a swash plate angle sensor, or a current command value for controlling a swash plate angle and a value of a discharge pressure sensor.

The calculating of the hydraulic pump torque may include generating a delay in the hydraulic pump torque increased according to an increase in the discharge pressure of the hydraulic pump to compensate for a time delay of a swash plate angle of the hydraulic pump.

The calculating of the hydraulic pump torque may include calculating the hydraulic pump torque by using a temperature of working fluid in addition to the discharge pressure of the hydraulic pump, a pressure for power shift control, and a regulator control value.

The calculating of the compensation torque may include calculating a compensation torque by using a table according to the calculated engine speed error and a load quantity, or a PID controller.

The method may be applied to any one of a hydraulic system of a negacon method, a hydraulic system of a posicon method, and a hydraulic system of a load sensing method. For the negacon hydraulic system using two pumps, a discharge flow rate and a torque of a corresponding hydraulic pump may be estimated by using a first discharge pressure, a second discharge pressure, a first negacon pressure, a second negacon pressure, and a power shift pressure. In this case, in order to accurately calculate a flow rate and torque, aforementioned five control pressures need to be recognized. For the posicon hydraulic system using two pumps, a discharge flow rate and a torque of a corresponding hydraulic pump may be estimated by using all of a first discharge pressure that is a pressure of a regulator, a second discharge pressure, a first posicon pressure, a second posicon pressure, and a power shift pressure. For the hydraulic system of the load sensing method, a discharge flow rate and a torque of a corresponding hydraulic pump may be estimated based on a regulator control pressure, such as a first regulator control pressure, a second regulator control pressure, and a third regulator control pressure of a corresponding hydraulic pump.

In the meantime, for the electronic hydraulic pump for controlling a flow rate by a current command, such as virtual bleed-off (VBO), a flow rate of the hydraulic pump may be calculated and a torque of the hydraulic pump may be estimated by using a first discharge pressure, a second discharge pressure, a first current command value, a second current command value, a value of a first swash plate angle sensor, and a value of a second swash plate angle sensor. In the electronic pump, such as the VBO, the regulator for controlling a swash plate angle moves according to a current command calculated by a pump control unit. That is, in order to calculate a flow rate of the VBO pump, the flow rate may be estimated by using a value of the swash plate angle sensor or a current command value for controlling a swash plate angle and a value of a discharge pressure sensor. A torque of the hydraulic pump may be estimated by using the estimated pump flow rate and the detected value of the discharge pressure sensor. That is, a torque of the electronic pump may be estimated by using the first discharge pressure, the second discharge pressure, the value of the first swash plate angle sensor, the value of the second swash plate angle sensor, or all of the first discharge pressure, the second discharge pressure, the first current command value, the second current command value, the value of the first swash plate angle sensor, and the value of the second swash plate angle sensor.

The method may further include: receiving engine torque limit information and current engine torque information; calculating a torque of the hydraulic pump; calculating a hydraulic pump output limit, which is to be commanded to the hydraulic pump, by using the engine torque limit information and the torque of the hydraulic pump; determining whether a current hydraulic pump output calculated by using a pump discharge pressure and a pump model is greater than the hydraulic pump output limit; determining whether a difference value between the current engine torque information and the engine torque limit information is equal to or smaller than a predetermined reference value when the current hydraulic pump output is greater than the hydraulic pump output limit; and controlling an output of the hydraulic pump in proportion to the difference value between the current hydraulic pump output and the hydraulic pump output limit when the difference value between the current engine torque information and the engine torque limit information is equal to or smaller than the predetermined reference value.

The method may further include: determining whether an increase rate of the pump discharge pressure is equal to or greater than a predetermined increase rate; and determining whether a duration time of the increase rate of the pump discharge pressure is equal to or greater than a predetermined duration time when the increase rate of the pump discharge pressure is equal to or greater than the predetermined increase rate, in which when the duration time of the increase rate of the pump discharge pressure is equal to or greater than the predetermined duration time, it is determined that a rapid load is generated in the hydraulic pump, and the engine torque limit information and the current engine torque information are received.

According to the exemplary embodiments of the present disclosure, it is possible to more stably perform compensation control on an error occurring when the engine control unit performs the compensation control.

Further, according to the exemplary embodiments of the present disclosure, it is possible to more stably performing engine control while responding to a rapid load variation of the hydraulic pump by calculating a target engine torque from compensation torque information using torque information generated in a hydraulic pump and an engine speed error and transmitting the calculated target engine torque.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
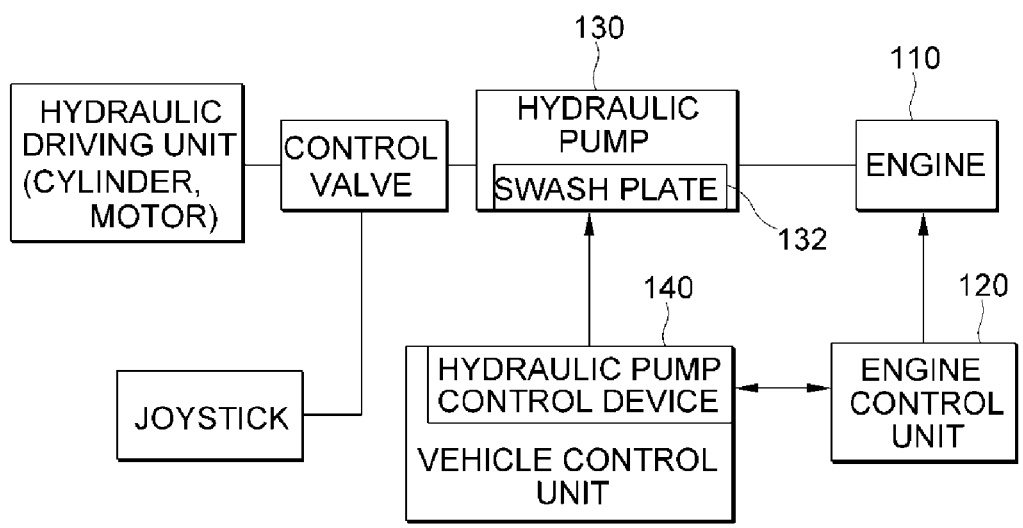
FIG. 1 is a configuration diagram of a vehicle control system of construction equipment according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Technical terms used in the present application are used only to describe specific exemplary embodiments, and are not intended to limit the present disclosure. Further, technical terms used in the present specification shall be construed to have the meanings which are generally understood by those skilled in the art unless they are differently defined, and shall not be construed to have excessively general or narrow meanings. Further, when technical terms used in the present specification are improper technical terms, which fail to correctly express the spirit of the present disclosure, the technical terms shall be substituted with technical terms, which those skilled in the art may properly understand, to be understood. Further, a general term used in the present disclosure shall be construed according to a meaning defined in a dictionary or the context of a related description, and shall not be construed to have an excessively general or narrow meaning.

Further, singular expressions used in the present specification include plurals expressions unless they have definitely opposite meanings. In the present application, terms, such as "including" or "comprising", shall not be construed that various constituent elements or steps described in the specification need to be essentially included, and shall be construed that some constituent elements or steps among the various constituent elements or steps may be omitted, or additional constituent elements or steps may be further included.

Further, a "module" and "unit" suffixes for components used in the present specification are given or mixed and used by considering only easiness in preparing a specification and do not have a meaning or role distinguished from each other in themselves.

Terms, such as "first" and "second", used in the present specification may be used for describing various constituent elements, but the constituent elements should not be limited by the terms. The terms are used only to discriminate one constituent element from another constituent element. For example, without departing a scope of the exemplary embodiment, the first component may be referred to as the second component and similarly, the second component is also referred to as the first component.

Hereinafter, an exemplary embodiment of the present disclosure will be described in detail with reference to the accompanying drawings, in which like reference numerals refer to like or similar constituent elements regardless of reference numerals and a duplicated description thereof will be omitted.

In describing the present disclosure, when it is determined that the detailed description of the known art related to the present disclosure may obscure the gist of the present disclosure, the detailed description thereof will be omitted. Further, it is noted that the accompanying drawings are used just for easily appreciating the spirit of the present disclosure and it should not be analyzed that the spirit of the present disclosure is limited by the accompanying drawings.

In general, a hydraulic pump control device according to an exemplary embodiment of the present disclosure is continuously operated from a moment at which a vehicle starts to a time when the vehicle is stalled. However, the hydraulic pump control device may be implemented so as to be operated only under a rapid load condition, that is, a special case. In a special case, an engine control unit (ECU) and a hydraulic pump control device (electronic power optimizing system (EPOS)) may transmit and/or receive (transceiver) pump torque information through CAN communication in real time. In this case, as a control period is short, an effect of the transmittal and/or reception (transception) of the pump torque information is good, so that as a CAN update rate is large, the effect is good. Currently, signals having a most frequent CAN update rate are updated for every 10 ms in the construction equipment, so that the hydraulic pump torque information for torque compensation engine control may be updated for every 10 ms. However, to this end, a quantity of CAN information is excessively increased, so that a stable operation may not be secured by a CAN load rate. In order to prepare the situation, the hydraulic pump control operation according to the present disclosure may be performed only under the rapid load condition.

FIG. 1 is a configuration diagram of a vehicle control system of construction equipment according to an exemplary embodiment of the present disclosure.

Referring to FIG. 1, a vehicle control system of construction equipment according to an exemplary embodiment of the present disclosure includes an engine 110, an engine control unit 120, a hydraulic pump 130, and a hydraulic pump control device 140.

The engine control unit 120 controls the engine 110 by using engine limit torque information and current engine torque information of the engine 110. The engine control unit 120 may provide another device with the engine limit torque information and the current engine torque information in a form of a CAN signal.

The hydraulic pump 130 is operated by power supplied from the engine 110.

The hydraulic pump control device 140 calculates a torque of the hydraulic pump 130 by using a pump discharge capacity and a pump discharge pressure of the hydraulic pump 130. The hydraulic pump control device 140 may receive the engine limit torque information and the current engine torque information from the engine controller 120 through CAN communication.

The hydraulic pump control device 140 directly measures a pressure value through a pressure sensor, and calculates a discharge pressure of the hydraulic pump by using the measured pressure value. In this case, the measured pressure value may include a load entering from the outside. The hydraulic pump control device 140 may calculate a position of swash plate tilting angle or the hydraulic pump capacity through a sensor or a table.

Here, the hydraulic pump control device 140 transmits the calculated discharge pressure of the hydraulic pump in the form of a CAN signal, so that a CAN delay may be generated. Accordingly, the hydraulic pump control device 140 may transmit the discharge pressure of the hydraulic pump to the engine control unit 120 by considering the position of the swash plate tilting angle of the hydraulic pump or an intermediate value of a current capacity of the hydraulic pump and a target capacity of the hydraulic pump. The target capacity means a target value controlled by hardware, by a control logic or a pump regulator. The intermediate value needs not to be essentially limited to an average ((actual value+target value)/2). The intermediate value may be tuned by a test in an actual vehicle to be designated as a tuning parameter.

The control logic may be performed by a vehicle control unit, not the hydraulic pump control device 140. Then, the hydraulic pump control device 140 may control only the hydraulic pump 130, and receive a control command from the vehicle control unit. Further, the hydraulic pump control device 140 calculates and provides a hydraulic pump torque to be used to compensation control of the engine. The vehicle control unit may perform the compensation control or transmit pump torque information to the engine control unit 120.

Figure 2:
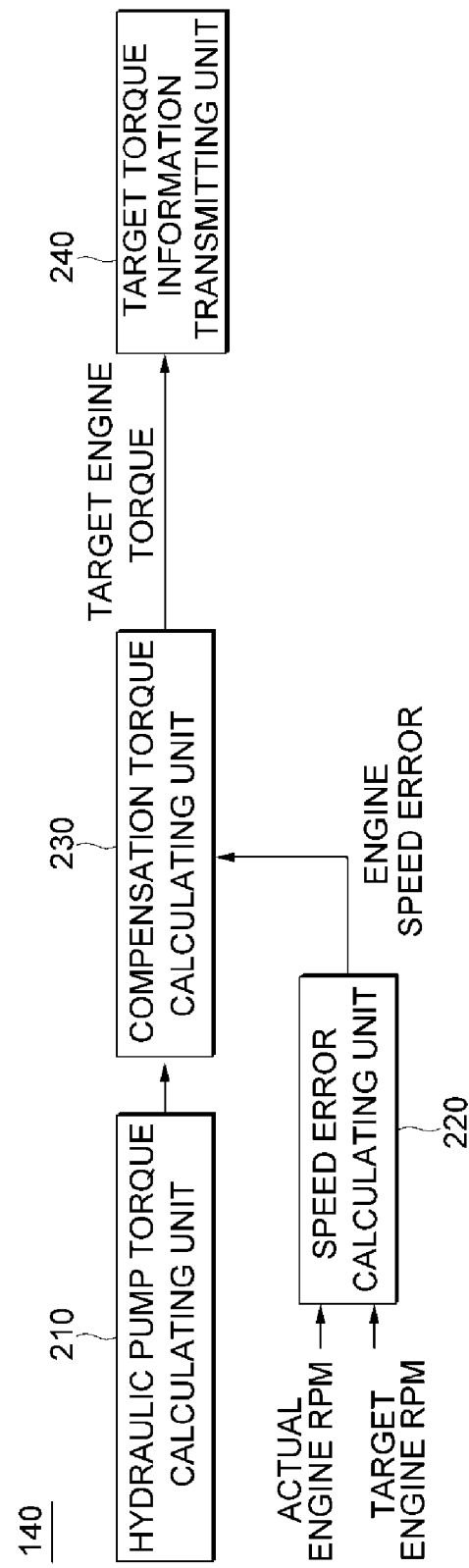
FIG. 2 is a configuration diagram of a hydraulic pump control device of the construction equipment according to the exemplary embodiment of the present disclosure.

FIG. 2 is a configuration diagram of the hydraulic pump control device of the construction equipment according to the exemplary embodiment of the present disclosure.

Referring to FIG. 2, the hydraulic pump control device 140 according to the exemplary embodiment of the present specification includes a hydraulic pump torque calculating unit 210, a speed error calculating unit 220, a compensation torque calculating unit 230, and a target torque information transmitting unit 240.

Hereinafter, each of the constituent elements of the hydraulic pump control device 140 according to the exemplary embodiment of the present specification will be described.

Negacon is an abbreviation for negative flow control among a hydraulic system. A pressure of a hydraulic line, which returns from a MCV (Main Control Valve) to a tank, is called the negacon control pressure. The negacon control pressure is concerned in the control of a hydraulic pump. Posicon is an abbreviation for positive flow control among a hydraulic system. A pilot pressure of a joystick is called the posicon control pressure. The posicon control pressure is also concerned in the control of a hydraulic pump. The hydraulic pump torque calculating unit 210 calculates a hydraulic pump torque by using a discharge pressure of the hydraulic pump, a pressure for power shift control, and a negacon pressure. In this case, the hydraulic pump torque calculating unit 210 may generate a delay in a hydraulic pump demanded torque increased according to an increase of a discharge pressure of the hydraulic pump to compensate for a time delay by a swash plate angle of the hydraulic pump. Further, the hydraulic pump torque calculating unit 210 may calculate a hydraulic pump torque by using a working fluid temperature together with the discharge pressure of the hydraulic pump, the pressure for controlling a power shift, and the negacon pressure in order to prevent an error of a torque from being generated according to a state of a working fluid.

In the meantime, when the hydraulic pump is another hydraulic pump, other than a hydraulic pump by a negacon control method, the hydraulic pump torque calculating unit 210 may calculate a hydraulic pump torque by using a control pressure or a control signal of a regulator which controls a swash plate angle of the hydraulic pump.

The speed error calculating unit 220 calculates an engine speed error between an actual engine RPM and the target engine RPM. The construction equipment essentially needs to uniformly maintain an engine speed in order to maintain uniform operation performance, but it is difficult to property calculate a target engine torque in order to uniformly maintain an engine speed only by the calculated hydraulic pump torque. Accordingly, the speed error calculating unit 220 calculates an engine speed error and transmits the calculated engine speed error to the compensation torque calculating unit 230, so that the compensation torque calculating unit 230 may calculate the compensated target engine torque of the engine by using the hydraulic pump torque and the engine speed error.

The speed error calculating unit 220 may calculate an engine speed error by using two methods. First, the speed error calculating unit 220 calculates only an engine speed error and transmits the calculated engine speed error to the compensation torque calculating unit 230. Then, the compensation torque calculating unit 230 reflects the engine speed error to the compensation control together with the hydraulic pump torque through PID control and the like. Second, the speed error calculating unit 220 calculates a pump torque according to an error of an RPM through the PID control and the like based on the engine speed error. Then, the speed error calculating unit 220 transmits the calculated pump torque to the compensation torque calculating unit 230. Then, the compensation torque calculating unit 230 performs the compensation control by using the pump torque.

The compensation torque calculating unit 230 calculates a compensation torque by using the hydraulic pump torque calculated by the hydraulic pump torque calculating unit 210 and the engine speed error calculated by the speed error calculating unit 220, compensates for the calculated hydraulic pump torque with the compensation torque, and outputs the compensated torque as a target engine torque. That is, the compensation torque calculation unit 230 compensates for the calculated hydraulic pump torque with a target engine torque, which the engine needs to output, by using the engine speed error. As the engine speed error is large, a value compensated for the hydraulic pump torque is increased, so that a difference between the hydraulic pump torque and the target engine torque is increased. By contrast, as the engine speed error is small, a value for compensating for the hydraulic pump torque is increased, so that a difference between the hydraulic pump torque and the target engine torque is decreased. The compensation torque calculation unit 230 may calculate a torque compensation value according to the engine speed error by using an experimental table according to an engine speed and a load quantity. Further, the compensation torque calculation unit 230 may calculate a compensation torque value according to the engine speed error by using a PID controller.

The target torque information transmitting unit 240 transmits the compensated target engine torque calculated by the compensation torque calculation unit 230 to the engine control unit 120 as a target engine torque. For example, the target torque information transmitting unit 240 may transmit the hydraulic pump demanding torque to the engine control unit 120 by using a CAN protocol.

The engine control unit 120 performs torque control on the target engine torque, which the engine is to follow, by using the target engine torque of the engine received through the target torque information transmitting unit 240. Accordingly, the engine control unit 120 according to the present specification may decrease excessive fuel injection of the engine, and make the engine inject an accurate quantity of fuel at an accurate time.

Hereinafter, a configuration and an operation of each of the constituent elements of the hydraulic pump torque calculating unit 210 of FIG. 2 according to an exemplary embodiment and another exemplary embodiment will be described in detail with reference to FIGS. 3 and 4.

In the meantime, the hydraulic pump control device 140 according to the present disclosure may calculate a torque of the hydraulic pump 130 as described below.

Figure 3:
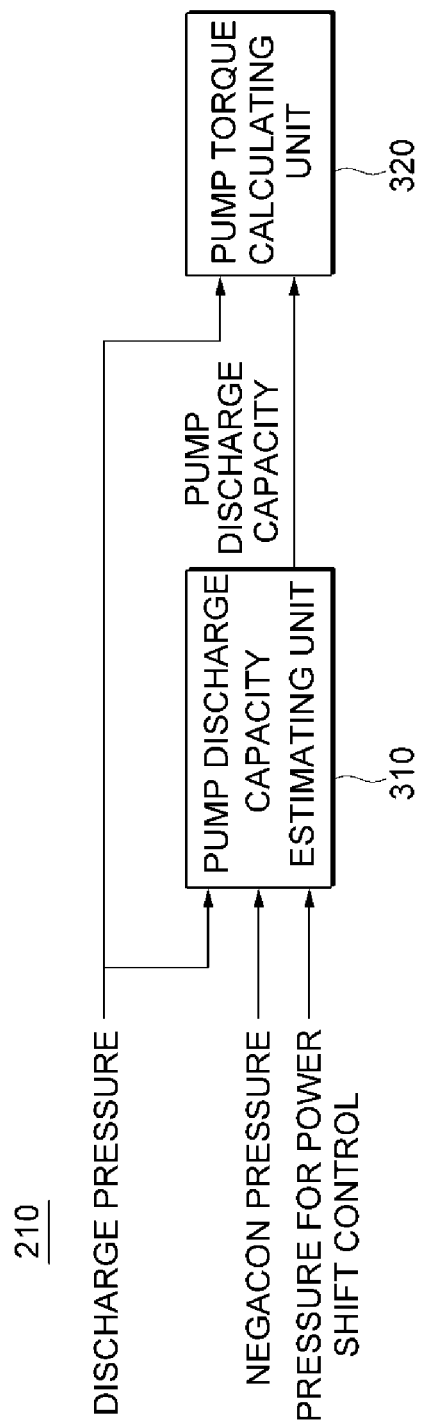
FIG. 3 is a configuration diagram of a hydraulic pump torque calculating unit of FIG. 2 according to the exemplary embodiment of the present disclosure.

Referring to FIG. 3, the hydraulic pump control device 140 according to the present disclosure may include a pump discharge capacity estimating unit 310, a pump torque calculating unit 320, and the like.

The pump discharge capacity estimating unit 310 receives all of the pressures controlling the regulator for determining a flow rate of the hydraulic pump 130 as input values. That is, the pump discharge capacity estimating unit 310 receives a pump discharge pressure, a negacon pressure, and a pressure for power shift control, which enter the control pressure of the regulator from the hydraulic pump by the negacon control method, as input values. The pump discharge capacity estimating unit 310 may estimate a pump discharge capacity by using the received control pressures and a table predetermined based a design of a compressing hydraulic pump and a performance experiment material. In this case, the pump discharge capacity estimating unit 310 may estimate a pump discharge capacity by adding a time delay element considering a dynamic delay property of a swash plate angle.

Next, the pump torque calculating unit 320 calculates a torque of the hydraulic pump 130 by using the measured pump discharge pressure and the pump discharge capacity estimated by the pump discharge capacity estimating unit 310.

In this case, a method of calculating a torque of the hydraulic pump 130 by using the pump discharge pressure and the pump discharge capacity by the pump torque calculating unit 320 may be divided into two methods.

First, the pump torque calculating unit 320 may calculate a torque of the hydraulic pump 130 by using a pump discharge pressure Pd, a pump discharge capacity q, and pump efficiency η as expressed by Equation 1 below.

$$TQ = [(Pd \times q)/2\Pi]/\eta \qquad \text{[Equation 1]}$$

Here, TQ represents a pump torque, Pd represents a pump discharge pressure, q represents a pump discharge capacity, and η represents pump efficiency.

Second, the pump torque calculating unit 320 may calculate a torque of the hydraulic pump 130 by using a pre-stored table. Here, the table may be a table configured by pump discharge pressures and pump discharge capacities based on the design of the hydraulic pump and a test result as input values.

The pump torque calculating unit 320 may calculate a torque of the hydraulic pump 130 by applying interpolation to an adjacent value of the table for an input value, which is not present in the table.

When the hydraulic pump is a hydraulic pump of another control method, not the hydraulic pump of the negacon control method, the pump discharge capacity estimating unit 310 may estimate the pump discharge capacity by using a control pressure of the regulator controlling a swash plate 132 of the hydraulic pump 130. Here, the regulator may control the swash plate of a capacity variable hydraulic pump.

Figure 4:
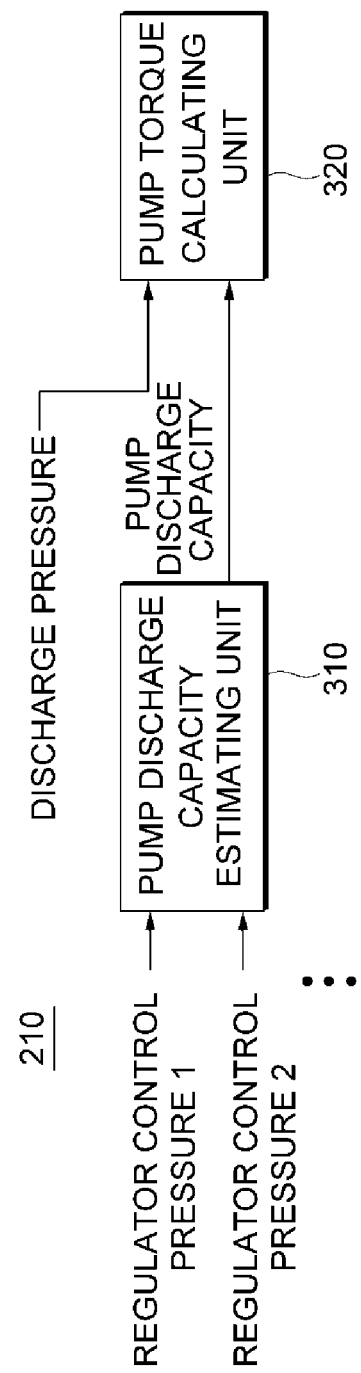
FIG. 4 is a configuration diagram of a hydraulic pump torque calculating unit of FIG. 2 according to another exemplary embodiment of the present disclosure.

As illustrated in FIG. 4, when the regulator controlling the swash plate 132 of the hydraulic pump 130 is controlled by a first regulator control pressure and a second regulator control pressure, the pump discharge capacity estimating unit 310 may estimate a pump discharge capacity by using the first regulator control pressure and the second regulator control pressure. In this case, when the regulator is controlled by the first regulator control pressure, the second regulator control pressure, . . . , and an $N^{th}$ regulator control pressure, the pump discharge capacity estimating unit 310 may estimate a pump discharge capacity by using the first regulator control pressure, the second regulator control pressure, . . . , and the $N^{th}$ regulator control pressure. That is, the first regulator control pressure, the second regulator control pressure, and the like transmitted as control inputs for the regulator may be input to the pump discharge capacity estimating unit 310. The pump discharge capacity estimated by the pump discharge capacity estimating unit 310 may be transmitted to the pump torque calculating unit 320 similar to FIG. 2, so that a torque of the hydraulic pump 130 may be calculated.

Further, the pump discharge capacity estimating unit 310 may also estimate a pump discharge capacity by using a value measured by a swash plate sensor installed in the swash plate 132 of the hydraulic pump 130.

The hydraulic pump control device 140 may control a swash plate angle or a limited swash plate angle of the hydraulic pump 130 by using the torque of the hydraulic pump 130 and engine torque limit information received from the engine control unit 120.

Further, the limited swash plate angle of the hydraulic pump according to the engine torque limit information may be predetermined by an engine manufacturing company, a pump manufacturing company, or a construction equipment manufacturing company. Here, the limited swash plate angle of the hydraulic pump corresponding to the engine torque limit information may be pre-created in the form of a table. Accordingly, the table may be embedded in the hydraulic pump control device 140 in the form of table values based on the designs of the engine and the hydraulic pump, and a test result. Accordingly, the hydraulic pump control device 140 may control the swash plate 132 of the hydraulic pump 130 according to the limited swash plate of the hydraulic pump stored in the table. Here, the limited swash plate means a threshold value of the swash plate angle controlled according to the engine torque limit information. To this end, a maximum control value of the limited swash plate angle matched one to one to the engine torque limit information may be configured in the form of a table, or the engine torque limit information and a maximum control value of the limited swash plate may be functionalized.

Further, the hydraulic pump control device 140 may limit a torque of the hydraulic pump 130 in proportion to a difference value between a current hydraulic pump output and a hydraulic pump output limit to control an output of the hydraulic pump 130. For example, the hydraulic pump control device 140 may limit an increase inclination of a torque of the hydraulic pump 130 in proportion to a difference value between a current hydraulic pump output and a hydraulic pump output limit to control an output of the hydraulic pump 130. Accordingly, the hydraulic pump control device 140 may control all of a flow controlling pump and a pressure controlling pump in proportion to the same reference, that is, a difference value between a current hydraulic pump output and a hydraulic pump output limit.

Further, when a difference value between the engine torque limit information and the torque of the hydraulic pump 130 is equal to or greater than a specific value, the hydraulic pump control device 140 may additionally compensate for the limited swash plate angle of the hydraulic pump 130 to be decreased. When the difference value between the engine torque limit information and the torque of the hydraulic pump 130 is equal to or greater than the specific value, the hydraulic pump control device 140 may maximize a usable output of the engine 110 by increasing the limited swash plate of the hydraulic pump 130 to be greater than a predetermined value and increasing a torque of the hydraulic pump 130.

Further, the hydraulic pump control device 140 regularly controls a torque of the hydraulic pump 130 based on the engine torque limit information so that the current engine torque information does not exceed the engine torque limit information.

Further, the hydraulic pump control device 140 may also limit the increase inclination of the torque of the hydraulic pump 130 based on the engine torque limit information. That is, the hydraulic pump control device 140 may also maintain the current engine torque information not to exceed the engine torque limit information by using a limit value of the increase inclination of the torque (a torque rate limit) of the hydraulic pump 130 based on the engine torque limit information as a control variable.

In the meantime, both the negacon pressure and the pressure for power shift control may be demanded in order to estimate a pump capacity. Otherwise, only one pressure between the two pressures may be demanded. FIG. 3 may be applied to the hydraulic pump of the negacon control method, and FIG. 4 may be applied to a general case. That is, all of the discharge pressure, the negacon pressure, and the pressure for power shift control may correspond to first to third regulator control pressures in the regulator of the hydraulic pump. When such a relationship is expanded to a pump of a posicon method, the negacon pressure, and the pressure for power shift control may be substituted with a posicon pressure and a pressure for power shift control. For a simple mechanical pump having no pressure for power shift control or the posicon or negacon control pressure, the pressure may be substituted with a first discharge pressure, a second discharge pressure, a third discharge pressure, and the like.

Separately, the hydraulic pump control device 140 may estimate a capacity (flow rate) of the hydraulic pump from a sensor installed at the swash plate angle of the hydraulic pump. Further, the hydraulic pump control device 140 may directly calculate a torque of the hydraulic pump based on a pressure value of the pressure sensor and the capacity value of the swash plate angle sensor. The capacity value of the sensor may be calculated from a swash plate angle position.

Figure 5:
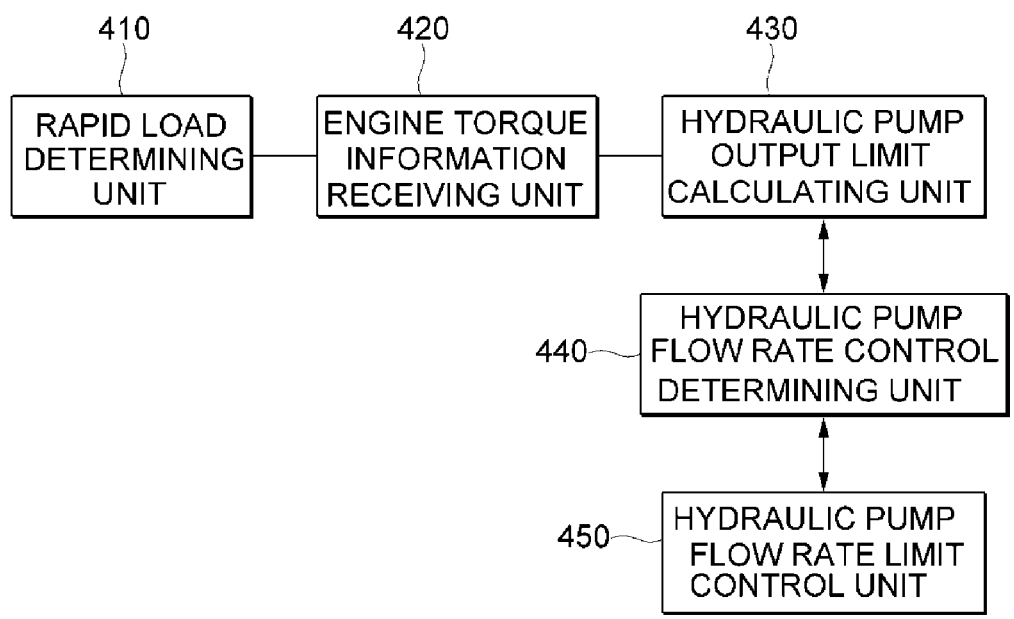
FIG. 5 is a configuration diagram of a hydraulic pump control device of construction equipment according to the exemplary embodiment of the present disclosure.

FIG. 5 is a configuration diagram of the hydraulic pump control device of construction equipment according to the exemplary embodiment of the present disclosure.

Referring to FIG. 5, the hydraulic pump control device 140 according to the pressure disclosure may further include a rapid load determining unit 410, an engine torque information receiving unit 420, a hydraulic pump output limit calculating unit 430, a hydraulic pump flow rate control determining unit 440, a hydraulic pump flow rate limit control unit 450, and the like.

The rapid load determining unit 410 determines whether a rapid load is generated by using an increase rate of the pump discharge pressure. Particularly, the rapid load determining unit 410 determines whether an increase rate of the pump discharge pressure is equal to or greater than a predetermined increase rate ($\Delta P/\Delta T$), and determines whether a duration time of the increase rate of the pump discharge pressure is equal to or greater than a predetermined duration time ($\Delta T1$) to determine whether a rapid load of the hydraulic pump 130 is generated. That is, when the increase rate of the pump discharge pressure is equal to or greater than the predetermined increase rate ($\Delta P/\Delta T$), and the duration time of the increase rate of the pump discharge pressure is equal to or greater than the predetermined duration time ($\Delta T1$), the rapid load determining unit 410 determines that the rapid load is generated in the hydraulic pump 130. A low pass filter may be applied to an input terminal of the rapid load determining unit 410 to prevent an erroneous operation.

When the rapid load is generated in the hydraulic pump 130 according to a result of the determination of the rapid load determining unit 410, the engine torque information receiving unit 420 receives the engine torque limit information and the current engine torque information by using the CAN protocol from the engine control unit 120. Here, the engine torque limit information includes a fuel quantity limited by exhaust gas regulations and engine torque information determined by a limited fuel quantity, and limit values of a torque and a fuel quantity limited for durability or performance protection of the engine, and the current engine torque information includes a target torque value and a currently estimated torque generation value of the engine.

The hydraulic pump output limit calculating unit 430 calculates a hydraulic pump limit output supplied to the hydraulic pump 130 by using the engine torque limit information received through the engine torque information receiving unit 420. Particularly, the hydraulic pump output limit calculating unit 430 calculates a limited pump flow rate corresponding to the engine torque by using and the engine torque limit information and a pump model of the hydraulic pump flow rate limit control unit 450, and calculates a hydraulic pump output limit to be limited based on the calculated limited pump flow rate and the current pump discharge pressure. Here, the limited pump flow rate is a flow rate which needs to be limited by the hydraulic pump flow rate limit control unit 450.

The hydraulic pump flow rate control determining unit 440 compares the hydraulic pump output limit calculated by the hydraulic pump limiting output calculating unit 430 and the current hydraulic pump output calculated by using the flow rate calculated by using the pump discharge pressure and the pump model, and when the current hydraulic pump output is greater than the hydraulic pump output limit, and a difference value between the current engine torque information and the engine torque limit information is equal to or smaller than a predetermined reference value ($\Delta TQ$), the hydraulic pump flow rate control determining unit 440 determines that a flow rate control function is activated.

Further, when the current hydraulic pump output is smaller than the hydraulic pump output limit, the hydraulic pump flow rate control determining unit 440 determines that the flow rate control function is not activated.

When the flow rate control function is activated according to a result of the determination of the hydraulic pump flow rate control determining unit 440, the hydraulic pump flow rate limit control unit 450 may control an output of the hydraulic pump 130 in proportion to a difference value between the current hydraulic pump output and the hydraulic pump output limit by using the power for controlling power shift (Pf pressure).

In this case, the hydraulic pump control device 450 may limit a torque of the hydraulic pump 130 in proportion to the difference value between the current hydraulic pump output and the hydraulic pump output limit to control an output of the hydraulic pump 130.

Further, the hydraulic pump flow rate limit control unit 450 may limit an increase inclination of the torque of the hydraulic pump 130 in proportion to the difference value between the current hydraulic pump output and the hydraulic pump output limit to control an output of the hydraulic pump 130. Accordingly, it is possible to control the flow rate control pump and the pressure control pump in proportion to the same reference, that is, the difference value between the current hydraulic pump output and the hydraulic pump output limit.

In addition, the hydraulic pump flow rate limit control unit 450 may be applied to various environments and various types of device by assigning a predetermined weighted value to the difference value between the current hydraulic pump output and the hydraulic pump output limit.

As described above, when the output is limited by the power shift control of the hydraulic pump flow rate limit control unit 450, the swash plate is operated in a direction of decreasing a flow rate, and it is possible to reduce excessive injection of the fuel by decreasing a load of the engine, and a load of the hydraulic pump is decreased to improve a rotation response of the engine.

Further, when the flow rate control function is inactivated according to the result of the determination of the hydraulic pump flow rate control determining unit 440, the hydraulic pump flow rate limit control unit 450 controls an output of the hydraulic pump according to a predetermined value.

In addition, when a difference value between the target engine RPM and the actual engine RPM is equal to or smaller than a predetermined reference value ($\Delta N$), the hydraulic pump flow rate limit control unit 450 terminates the control of an output of the hydraulic pump 130.

Figure 6:
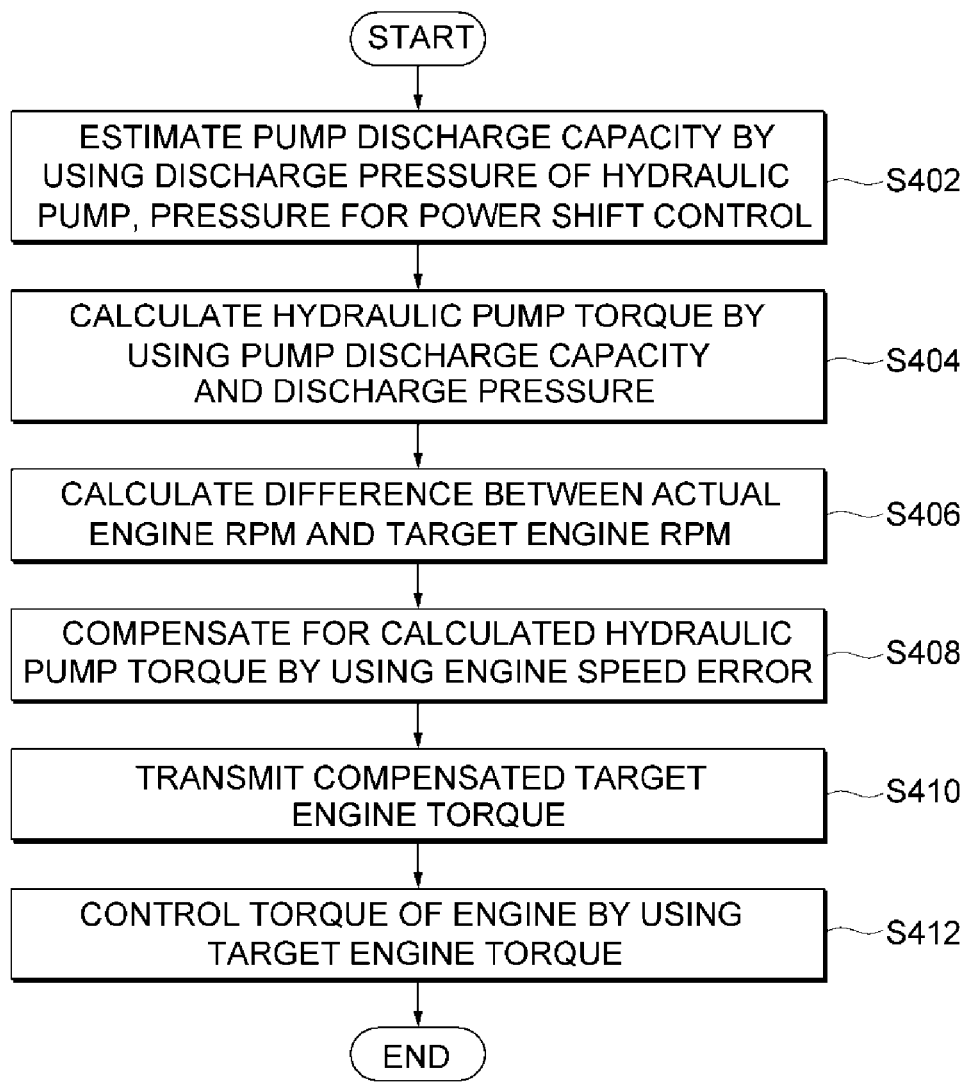
FIG. 6 is a flowchart of a vehicle control method of construction equipment according to an exemplary embodiment of the present disclosure.

FIG. 6 is a flowchart of a vehicle control method of construction equipment according to an exemplary embodiment of the present disclosure.

The hydraulic pump torque calculating unit 210 calculates a pump discharge capacity by using a discharge pressure of the hydraulic pump, a pressure for power shift control, and a negacon pressure (S402).

Further, the hydraulic pump torque calculating unit 210 calculates a hydraulic pump torque by using the pump discharge capacity and the discharge pressure (S404). In this case, the hydraulic pump torque calculating unit 210 may make a delay be generated in a hydraulic pump demanded torque increased according to an increase of a discharge pressure of the hydraulic pump to compensate for a time delay by a swash plate angle of the hydraulic pump.

Then, the speed error calculating unit 220 calculates an engine speed error between an actual engine RPM and a target engine RPM (S406). The speed error calculating unit 220 calculates an engine speed error and transmits the calculated engine speed error to the compensation torque calculating unit 230, so that the compensation torque calculating unit 230 may calculate a compensated target engine torque of the engine by using the hydraulic pump torque and the engine speed error (S408).

The compensation torque calculating unit 230 calculates a compensation torque by using the hydraulic pump torque calculated by the hydraulic pump torque calculating unit 210 and the engine speed error calculated by the speed error calculating unit 220, compensates for the calculated hydraulic pump torque with the compensation torque, and outputs the compensated torque as a target engine torque. That is, the compensation torque calculation unit 230 compensates for the calculated hydraulic pump torque with the engine speed error, as the torque with a target engine torque, which the engine needs to output.

The target torque information transmitting unit 230 transmits the compensated target engine torque calculated by the compensation torque calculation unit 230 to the engine control unit 120 as a target engine torque (S410). For example, the target torque information transmitting unit 240 may transmit the hydraulic pump demanding torque to the engine control unit 120 by using a CAN protocol.

The engine control unit 120 performs torque control on the target engine torque, which the engine is to follow, by using the target engine torque of the engine received through the target torque information transmitting unit 240 (S412).

In the meantime, when the hydraulic pump is another hydraulic pump, other than a hydraulic pump by a negacon control method, the hydraulic pump torque calculating unit 210 may calculate a hydraulic pump torque by using a control pressure of a regulator which controls the swash plate angle of the hydraulic pump in operation S402.

Figure 7:
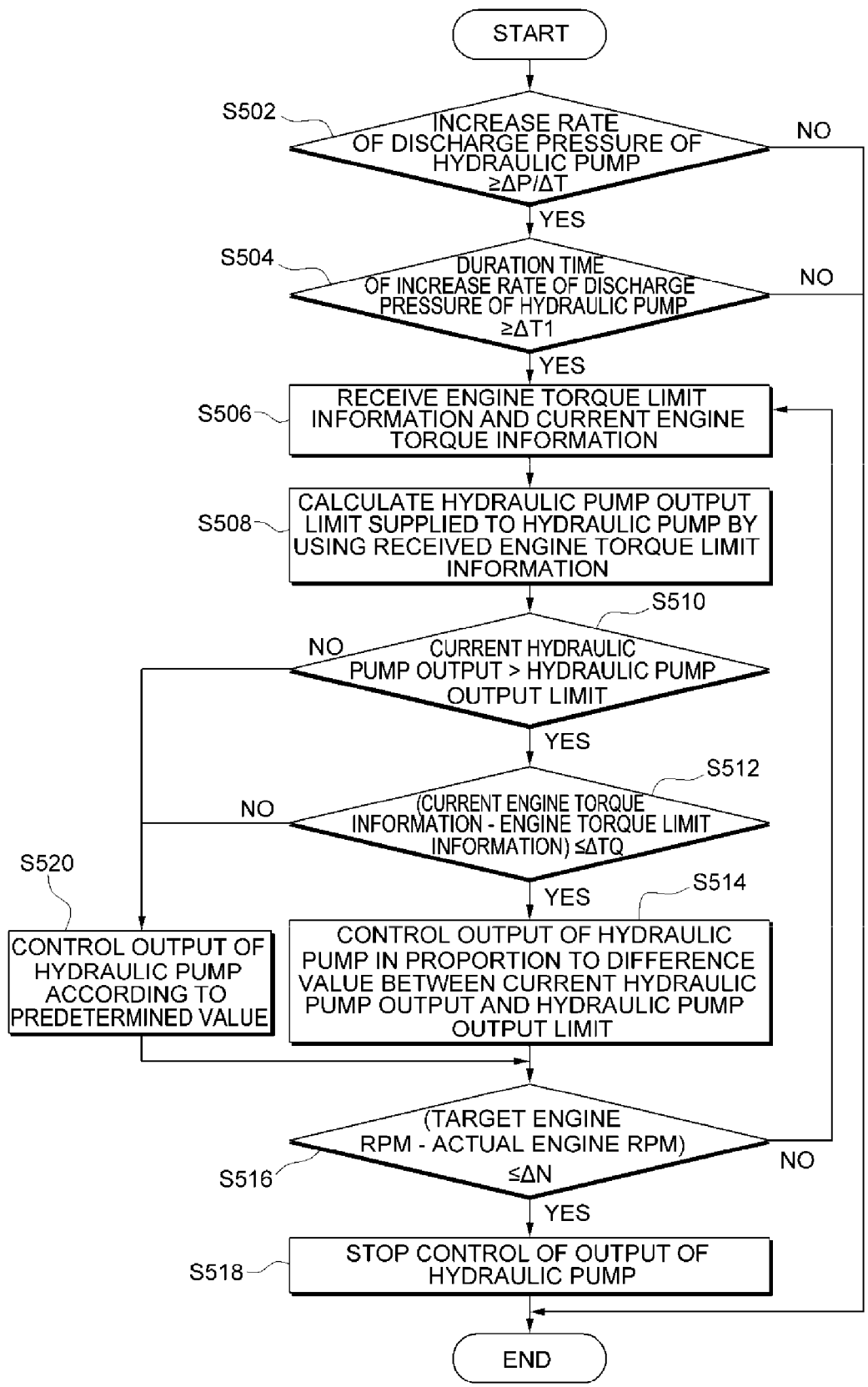
FIG. 7 is a flowchart of a hydraulic pump control method of construction equipment according to an exemplary embodiment of the present disclosure.

FIG. 7 is a flowchart of a hydraulic pump control method of construction equipment according to an exemplary embodiment of the present disclosure.

Referring to FIG. 7, the rapid load determining unit 410 determines whether an increase rate of the pump discharge pressure is equal to or greater than a predetermined increase rate ($\Delta P/\Delta T$) (S502).

When the increase rate of the pump discharge pressure is equal to or greater than the predetermined increase rate, the rapid load determining unit 410 determines whether a duration time of the increase rate of the pump discharge pressure is equal to or greater than a predetermined duration time ($\Delta T1$) (S504).

When the duration time of the increase rate of the pump discharge pressure is equal to or greater than the predetermined duration time, the engine torque information receiving unit 420 determines that the rapid load is generated in the hydraulic pump 130, and receives engine torque limit information and current engine torque information from the engine control unit 120 (S506).

The hydraulic pump output limit calculating unit 430 calculates a hydraulic pump output limit supplied to the hydraulic pump 130 by using the received engine torque limit information (S508). Particularly, the hydraulic pump limited output calculating unit 430 calculates a limited pump flow rate corresponding to the engine torque by using the engine torque limit information and a pump model of the hydraulic pump flow rate limit control unit 450, and calculates a hydraulic pump limited output to be limited based on the calculated limited pump flow rate and the current pump discharge pressure.

Next, the hydraulic pump flow rate control determining unit 440 determines whether the calculated current hydraulic pump output is greater than the hydraulic pump output limit by using the flow rate calculated by using the pump discharge pressure and the pump model (S510).

When the current hydraulic pump output is greater than the hydraulic pump output limit, the hydraulic pump flow rate control determining unit 440 determines whether a difference value between the current engine torque information and the engine torque limit information is equal to or smaller than a predetermined reference value ($\Delta TQ$) (S512).

When the difference value between the current engine torque information and the engine torque limit information is equal to or smaller than the predetermined reference value, the hydraulic pump flow rate limit control unit 510 determines that a flow rate control function is activated, and controls an output of the hydraulic pump 130 in proportion to a difference value between an current hydraulic pump output and a limited hydraulic pump limit output (S514).

When the current hydraulic pump output is smaller than the hydraulic pump output limit, or the difference value between the current engine torque information and the engine torque limit information exceeds the predetermined reference value, the hydraulic pump flow rate limit control unit 450 determines that the flow rate control function is inactivated, and controls an output of the hydraulic pump 130 according to a predetermined value (S520).

In addition, the hydraulic pump flow rate control determining unit 440 determines whether a difference value between a target engine RPM and an actual engine RPM is equal to or smaller than a predetermined reference value ($\Delta N$) (S516).

When the difference value between the target engine RPM and the actual engine RPM is equal to or smaller than the predetermined reference value, the hydraulic pump flow rate limit control unit 450 stops the control of the output of the hydraulic pump 130 regardless of activation or inactivation of the flow rate control function (S518).

When the difference value between the target engine RPM and the actual engine RPM exceeds the predetermined reference value, the process returns to operation S506, and the engine torque information receiving unit 420 receives the engine torque limit information and the current engine torque information and then subsequent procedures are sequentially performed.

The aforementioned method may be implemented by various means. For example, the exemplary embodiments of the present disclosure will be implemented by hardware, firmware, software, or a combination thereof.

When the exemplary embodiments of the present disclosure are implemented by hardware, the method according to the exemplary embodiments of the present disclosure may be implemented by one or more of correspondingly configured application specific integrated circuits (ASICs), digital signal processors (DSPs), digital signal processing devices (DSPDs), programmable logic devices (PLDs), field programmable gate arrays (FPGAs), processors, controllers, microcontrollers, and microprocessors. The configuration of these devices to implement the disclosed embodiment, including the disclosed units and/or method or process steps, constitutes a uniquely structured apparatus, machine or system.

When the exemplary embodiments of the present disclosure are implemented by firmware or software, the method according to the exemplary embodiments of the present disclosure may be implemented by a form of a module, a procedure, a function, and the like performing the aforementioned functions or operations. A software code may be stored in one or more memory units and driven by one or more processors. The software code, in the form of computer readable instructions, configures the processor(s) to implement the described steps of a partially or completely computer implemented method, or to implement the functions of the described units or other components. The memory unit(s), embodiments of computer readable media or medium, may be positioned inside and/or outside the processor(s) to transceive data with the processor by already publicly known various means.

The exemplary embodiments disclosed in the present specification have been described with reference to the accompanying drawings. As described above, the exemplary embodiments illustrated in the respective drawings shall not be limitedly construed, and it may be construed that the exemplary embodiments may be combined by those fully understanding the contents of the present specification, and when the exemplary embodiments are combined, some constituent elements may be omitted.

Here, the terms or words used in the present specification and the claims should not be construed as being limited as a commonly used or lexical meaning, and should be construed as a meaning and a concept to conform to the technical spirit disclosed in the present specification.

Therefore, the exemplary embodiments described in the present specification and the configurations illustrated in the drawings are only an exemplary embodiment disclosed in the present disclosure and do not represent all of the technical spirit of the present disclosure, and thus it is to be understood that various equivalent matters and modified examples, which may replace the configurations, are possible at the time of filing the present application.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system for controlling a vehicle of construction equipment, comprising:
   an engine;
   a hydraulic pump operated by power supplied from the engine;
   one or more actuators driven by a hydraulic pressure discharged from the hydraulic pump;
   a hydraulic pump control device including circuitry configured to:
   calculate a compensation torque according to a hydraulic pump torque and an engine speed error between an actual engine RPM and a target engine RPM;
   compensate for the hydraulic pump torque with the calculated compensation torque; and
   output a compensated hydraulic pump torque as a target engine torque; and
   an engine control circuit configured to control a torque of the engine based on the outputted target engine torque.

2. The system of claim 1, wherein the hydraulic pump control device includes:
   a hydraulic pump torque calculating circuit configured to calculate the hydraulic pump torque by using a discharge capacity and a discharge pressure of the hydraulic pump;
   a speed error calculating circuit configured to calculate the engine speed error between the actual engine RPM and the target engine RPM;
   a target torque information transmitting circuit configured to transmit the output target engine torque to the engine control circuit.

3. The system of claim 2, wherein the hydraulic pump torque calculating circuit calculates the discharge capacity of the hydraulic pump by using a pressure selected from a pressure for power shift control and a negacon pressure, and the discharge pressure of the hydraulic pump.

4. The system of claim 2, wherein when the hydraulic pump is an electronic pump controlled by a current value, the hydraulic pump torque calculating circuit calculates the discharge capacity of the hydraulic pump by using a value of a swash plate angle sensor, or a current command value for controlling a swash plate angle and a value of a discharge pressure sensor.

5. The system of claim 2, wherein the hydraulic pump torque calculating circuit calculates the discharge capacity of the hydraulic pump by using a control pressure of a regulator which controls a swash plate angle or a value of a swash plate angle sensor.

6. The system of claim 2, wherein the hydraulic pump torque calculating circuit generates a delay in the hydraulic pump torque increased according to an increase in the discharge pressure of the hydraulic pump to compensate for a time delay of a swash plate angle of the hydraulic pump.

7. The system of claim 2, wherein the hydraulic pump torque calculating circuit calculates the hydraulic pump torque by using a temperature of working fluid in addition to the discharge pressure of the hydraulic pump, a pressure for power shift control, and a regulator control value.

8. The system of claim 2, wherein a compensation torque calculating circuit calculates the compensation torque by using a table according to the calculated engine speed error and a load quantity, or a PID controller.

9. The system of claim 2, wherein an input value of a regulator, which controls a swash plate angle of the hydraulic pump is at least one of a negacon pressure, a posicon pressure, and a posicon input signal.

10. The system of claim 2, wherein the hydraulic pump control device further includes:
    an engine torque information receiving circuit configured to receive engine torque limit information and current engine torque information;
    a hydraulic pump output limit calculating circuit configured to calculate a hydraulic pump output limit, which is to be commanded to the hydraulic pump, by using the engine torque limit information received through the engine torque information receiving circuit;
    a hydraulic pump flow rate control determining circuit configured to determine whether a current hydraulic pump output calculated by using a pump discharge pressure and a pump model is greater than a hydraulic pump output limit calculated by the hydraulic pump output limit calculating circuit, determine whether a difference value between the current engine torque information and the engine torque limit information is equal to or smaller than a predetermined reference value, and determine whether a flow rate limit control function is activated; and
    a hydraulic pump flow rate limit control circuit configured to control an output of the hydraulic pump in proportion to the difference value between the current hydraulic pump output and the hydraulic pump output limit when the flow rate limit control function is activated according to a result of the determination of the hydraulic pump flow rate control determining circuit.

11. The system of claim 10, further comprising:
a rapid load determining circuit configured to determine whether a rapid load is generated by using an increase rate of the pump discharge pressure,
wherein when the rapid load is generated in the hydraulic pump according to a result of the determination of the rapid load determining circuit, the engine torque information receiving circuit receives the engine torque limit information and the current engine torque information.

12. A method of controlling a vehicle of construction equipment, comprising:
calculating a hydraulic pump torque by using a discharge capacity and a discharge pressure of a hydraulic pump;
calculating an engine speed error between an actual engine RPM and a target engine RPM;
calculating a compensation torque by using the calculated hydraulic pump torque and the calculated engine speed error;
compensating for the calculated hydraulic pump torque with the calculated compensation torque; and
outputting the compensated torque as a target engine torque; and
controlling, by an engine control circuit, a torque of an engine based on the outputted engine target torque.

13. The method of claim 12, wherein the calculating of the hydraulic pump torque includes calculating the discharge capacity of the hydraulic pump by using a pressure selected from a pressure for power shift control and a negacon pressure, and the discharge pressure of the hydraulic pump.

14. The method of claim 12, wherein the calculating of the hydraulic pump torque includes, when the hydraulic pump is an electronic pump controlled by a current value, calculating the discharge capacity of the hydraulic pump by using a value of a swash plate angle sensor, or a current command value for controlling a swash plate angle and a value of a discharge pressure sensor.

15. The method of claim 12, wherein the calculating of the hydraulic pump torque includes generating a delay in the hydraulic pump torque increased according to an increase in the discharge pressure of the hydraulic pump to compensate for a time delay of a swash plate angle of the hydraulic pump.

16. The method of claim 12, wherein the calculating of the hydraulic pump torque includes calculating the hydraulic pump torque by using a temperature of working fluid in addition to the discharge pressure of the hydraulic pump, a pressure for power shift control, and a regulator control value.

17. The method of claim 12, wherein the calculating of the compensation torque includes calculating the compensation torque by using a table according to the calculated engine speed error and a load quantity, or a PID controller.

18. The method of claim 12, wherein an input value of a regulator, which controls a swash plate angle of the hydraulic pump is at least one of a negacon pressure, a posicon pressure, and a posicon input signal.

19. The method of claim 12, further comprising:
receiving engine torque limit information and current engine torque information;
calculating the torque of the hydraulic pump;
calculating a hydraulic pump output limit, which is to be commanded to the hydraulic pump, by using the engine torque limit information and the torque of the hydraulic pump;
determining whether a current hydraulic pump output calculated by using a pump discharge pressure and a pump model is greater than the hydraulic pump output limit;
determining whether a difference value between the current engine torque information and the engine torque limit information is equal to or smaller than a predetermined reference value when the current hydraulic pump output is greater than the hydraulic pump output limit; and
controlling an output of the hydraulic pump in proportion to the difference value between the current hydraulic pump output and the hydraulic pump output limit when the difference value between the current engine torque information and the engine torque limit information is equal to or smaller than the predetermined reference value.

20. The method of claim 19, further comprising:
determining whether an increase rate of the pump discharge pressure is equal to or greater than a predetermined increase rate; and
determining whether a duration time of the increase rate of the pump discharge pressure is equal to or greater than a predetermined duration time when the increase rate of the pump discharge pressure is equal to or greater than the predetermined increase rate,
wherein when the duration time of the increase rate of the pump discharge pressure is equal to or greater than the predetermined duration time, determining that a rapid load is generated in the hydraulic pump, and the engine torque limit information and the current engine torque information are received.

21. A system for controlling a vehicle of construction equipment, comprising:
an engine;
a hydraulic pump operated by power supplied from the engine;
one or more actuators driven by a hydraulic pressure discharged from the hydraulic pump;
a processor; and
a non-transitory computer readable medium, comprising:
instructions executable by the processor to calculate a compensation torque according to a hydraulic pump torque and an engine speed error between an actual engine RPM and a target engine RPM;
instructions executable by the processor to compensate for the calculated hydraulic pump torque with the calculated compensation torque;
instructions executable by the processor to output the compensated torque as a target engine torque; and
instructions executable by the processor to control, by an engine control circuit, a torque of the engine based on the output target engine torque.

22. The system of claim 21, wherein the non-transitory computer readable medium includes:
instructions executable by the processor to calculate a hydraulic pump torque by using a discharge capacity and a discharge pressure of the hydraulic pump;
instructions executable by the processor to calculate an engine speed error between the actual engine RPM and the target engine RPM;
instructions executable by the processor to calculate a compensation torque by using the calculated hydraulic pump torque and the calculated engine speed error;
instructions executable by the processor to compensate for the calculated hydraulic pump torque with the calculated compensation torque;
instructions executable by the processor to output the compensated torque as a target engine torque; and
instructions executable by the processor to control a torque of the engine based on the target engine torque.

* * * * *